(12) United States Patent
Vu et al.

(10) Patent No.: US 9,715,525 B2
(45) Date of Patent: Jul. 25, 2017

(54) METHOD AND SYSTEM FOR SEARCHING AND STORING DATA

(71) Applicants: Khalifa University of Science, Technology, and Research, Abu Dhabi (AE); British Telecommunications plc, London (GB); Emirates Telecommunications Corporation, Abu Dhabi (AE)

(72) Inventors: Quang Hieu Vu, Abu Dhabi (AE); Rasool Asal, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 568 days.

(21) Appl. No.: 13/929,870

(22) Filed: Jun. 28, 2013

(65) Prior Publication Data
US 2015/0006577 A1    Jan. 1, 2015

(51) Int. Cl.
G06F 17/30    (2006.01)

(52) U.S. Cl.
CPC .. *G06F 17/30451* (2013.01); *G06F 17/30716* (2013.01); *G06F 17/30985* (2013.01)

(58) Field of Classification Search
CPC ......... G06F 17/30985; G06F 17/30451; G06F 17/30716
See application file for complete search history.

(56) References Cited

U.S. PATENT DOCUMENTS

| | | | | |
|---|---|---|---|---|
| 5,511,159 | A | * | 4/1996 | Baker et al. .................. 715/700 |
| 6,353,873 | B1 | * | 3/2002 | Melchior .......... G06F 17/30982 365/189.07 |
| 6,614,789 | B1 | * | 9/2003 | Yazdani et al. ............... 370/392 |
| 2005/0135381 | A1 | * | 6/2005 | Dubnicki ................ H04L 29/06 370/395.32 |
| 2006/0059153 | A1 | * | 3/2006 | Lassalle ........... G06F 17/30625 |
| 2006/0200581 | A1 | * | 9/2006 | Cadambi et al. ............. 709/245 |
| 2008/0231483 | A1 | * | 9/2008 | He ........................ H04N 19/50 341/107 |
| 2010/0153420 | A1 | | 6/2010 | Yang et al. |

(Continued)

FOREIGN PATENT DOCUMENTS

WO    03/103240    12/2003

OTHER PUBLICATIONS

Tsuda et al. "Inter-Cloud Data Security for Secure Cloud-Based Business Collaborations"—Fujitsu Sci. Tech. J., vol. 48, No. 2, pp. 169-176 (Apr. 2012).

(Continued)

*Primary Examiner* — James Trujillo
*Assistant Examiner* — Jessica N Le
(74) *Attorney, Agent, or Firm* — Calfee, Halter & Griswold, LLP (57) ABSTRACT

This invention relates to methods for storing and searching data. Embodiments of the invention make use of suffix trees to support binary pattern matching. Embodiments of the invention can be shown to have comparable search speeds to searches of known suffix trees, but are advantageous in that they have lower memory usage requirements which is important in large data environments.

5 Claims, 2 Drawing Sheets

(56) References Cited

U.S. PATENT DOCUMENTS

| | | | |
|---|---|---|---|
| 2011/0046923 A1* | 2/2011 | Lee et al. | 703/1 |
| 2011/0137930 A1* | 6/2011 | Hao | G06F 17/30958 707/769 |
| 2011/0179030 A1* | 7/2011 | Lee et al. | 707/737 |
| 2011/0191382 A1* | 8/2011 | Ghoting | G06F 17/30 707/797 |
| 2012/0134494 A1 | 5/2012 | Liu | |
| 2014/0314137 A1* | 10/2014 | Lakkis | H04L 25/03006 375/232 |

OTHER PUBLICATIONS

Villanustre & Robinson "Data Security and Privacy in Data-Intensive Computing Clusters"—Handbook of Data Intensive Computing, Chapter 17, Springer Science+Business Media LLC 2011.

A. Andersson and S. Nilsson. Efficient implementation of suffix trees. Software Practice and Experience, 25(2):129-141, 1995.

L. M. S. Russo, G. Navarro, and A. L. Oliveira. Fully compressed suffix trees. ACM Transactions on Algorithms, 7(4):1-34, 2011.

T. Bell, M. Powell, A. Mukherjee, and D. Adjeroh. Searching BWT compressed text with the Boyer- Moore algorithm and binary search. In Proceedings of the IEEE Data Compression Conference, 2002.

S. T. Klein and M. K. Ben-Nissan. Accelerating Boyer-Moore Searches on Binary Texts. In Proceedings of the 12th International Conference on Implementation and Application of Automata, 2007.

E. M. McCreight. A space-economical suffix tree construction algorithm. In Journal of the ACM, vol. 23, pp. 262-272, 1976.

International Search Report dated Feb. 21, 2014, for corresponding International Patent Application Serial No. PCT/GB2013/051729.

Written Opinion dated Feb. 21, 2014, for corresponding International Patent Application Serial No. PCT/GB2013/051729.

* cited by examiner

METHOD AND SYSTEM FOR SEARCHING AND STORING DATA

FIELD OF THE INVENTION

The present invention relates to a method and system for searching and storing data. It is particularly but not exclusively related to methods and systems which create and use a novel data structure for the data.

BACKGROUND OF THE INVENTION

Suffix tree structure is very useful to support pattern matching as well as many other important string operations. It plays a key role in several types of applications that require complex string analysis and processing.

While a suffix tree can be constructed in time linear to the length of its input string, it always requires a large memory space for building and storing the tree structure. This means that if an input string is long and its large memory requirements cannot be satisfied, the performance of the suffix tree searching will degrade significantly. This space complexity is a great concern of applications that require processing on large data strings. These concerns are increased if the data is in binary format since suffix tree has to process data at the bit level, which is more complicated, as well as more space and time consuming.

To address the space complexity issue of the suffix tree structure to present binary strings, a number of solutions have been proposed to improve the efficiency in space usage by variant types of presentation and implementation [1]. However, the improvements achieved by these solutions are not great.

Alternatively, compression techniques have been proposed to reduce the space requirement for storing the tree structure. However, these solutions often result in some loss of functionality of the suffix tree [2].

There have also been efforts to support binary pattern matching by grouping bits into bytes ([3, 4] are examples). These works, however, are based on the modifications of Boyer-Moore algorithm to support pattern matching on the fly without taking the advantage of knowing the text in advance to build search indices.

SUMMARY OF THE INVENTION

An exemplary method storing a data string in a structured form, includes the steps of: dividing the data into as many complete subsets of predetermined length as possible with any remainder being designated as a postfix; arranging the subsets of data into a tree structure with nodes joined by edges representing one or more of the subsets; determining, for each edge in said tree, a prefix table which is a list of all possible prefixes for that subset within the data of lengths less than said predetermined length; and storing the subsets, the tree structure, the prefix tables and the postfix.

An exemplary method of determining whether a search string is contained in stored data which stores a plurality of data strings each in a structured form, the structured form including the storage of subsets of each data string of predetermined length stored in as the edges of a tree structure along with prefix data including all possible prefixes for each such edge which have length less than said predetermined length, includes the steps of: dividing the search string into a plurality of sub-searches, the number of sub-searches being equal to the predetermined length of the subsets and each sub-search containing a prefix, a main and a postfix, by the steps of: setting the prefix of the first sub-search to be null, setting the prefix of the second sub-search to be the first item in the search string, and setting the prefix of the ith sub-search to be the first (i−1) items in the search string for all remaining sub-searches; setting the main of each sub-search to be those items in the search string immediately following the prefix which make up complete subsets of the search string, the subsets being of said predetermined length; setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered: determining if the main of the sub-search is contained in the subsets of any of the stored data strings, if it is not then moving to the next sub-search; if it is, determining if the prefix of the sub-search is contained in the prefix data stored for that subset, if it is not then moving to the next sub-search; if it is, determining if the postfix of the sub-search is contained in the stored data strings by: a) if the last data entry in the main of the sub-search matched a subset of a stored data string that has subsequent subsets in the tree structure, determining if the postfix of the sub-search matches the initial part of any of those subsequent subsets; b) if the last data entry in the main of the sub-search matched a subset of a stored data string that has no subsequent subsets in the tree structure, determining if the postfix of the sub-search matches the initial part of the postfix of that stored data string; or c) if the last data entry in the main of the sub-search matched part of a subset of a stored data string, determining if the postfix of the sub-search matches the initial part of the remaining part of that subset.

An exemplary method of finding a specified sequence in one or more stored DNA sequences, wherein the stored DNA sequences are each stored in a structured form, the structured form including the storage of subsets of each DNA sequence of predetermined length stored in as the edges of a tree structure along with prefix data including all possible prefixes for each such edge which have length less than said predetermined length, includes the steps of: dividing the specified sequence into a plurality of sub-searches, the number of sub-searches being equal to the predetermined length of the subsets and each sub-search containing a prefix, a main and a postfix, by the steps of: setting the prefix of the first sub-search to be null, setting the prefix of the second sub-search to be the first item in the search string, and setting the prefix of the ith sub-search to be the first (i−1) items in the search string for all remaining sub-searches; setting the main of each sub-search to be those items in the search string immediately following the prefix which make up complete subsets of the search string, the subsets being of said predetermined length; setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered: determining if the main of the sub-search is contained in the subsets of any of the stored data strings, if it is not then moving to the next sub-search; if it is, determining if the prefix of the sub-search is contained in the prefix data stored for that subset, if it is not then moving to the next sub-search; if it is, determining if the postfix of the sub-search is contained in the stored data strings by: a) if the last data entry in the main of the sub-search matched a subset of a stored sequence that has subsequent subsets in the tree structure, determining if the postfix of the sub-search matches the initial part of any of those subsequent subsets; b) if the last data entry in the main of the sub-search matched a subset of a stored sequence that has no subsequent subsets in the tree structure, determining if the postfix of the sub-search matches the initial part of the postfix of that stored data string; or c) if the last data entry in the main of the sub-search matched part of a subset of a stored sequence, determining if the postfix of the sub-search matches the initial part of the remaining part of that subset.

An exemplary method of testing a pattern definition for a virus or other malware against known genuine data, wherein the genuine data is stored as a plurality of data strings each in a structured form, the structured form including the storage of subsets of each data string of predetermined length stored in as the edges of a tree structure along with prefix data including all possible prefixes for each such edge which have length less than said predetermined length, includes the steps of: dividing the pattern definition into a plurality of sub-searches, the number of sub-searches being equal to the predetermined length of the subsets and each sub-search containing a prefix, a main and a postfix, by the steps of: setting the prefix of the first sub-search to be null, setting the prefix of the second sub-search to be the first item in the search string, and setting the prefix of the ith sub-search to be the first (i−1) items in the search string for all remaining sub-searches; setting the main of each sub-search to be those items in the search string immediately following the prefix which make up complete subsets of the search string, the subsets being of said predetermined length; setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered: determining if the main of the sub-search is contained in the subsets of any of the stored data strings, if it is not then moving to the next sub-search; if it is, determining if the prefix of the sub-search is contained in the prefix data stored for that subset, if it is not then moving to the next sub-search; if it is, determining if the postfix of the sub-search is contained in the stored data strings by: a) if the last data entry in the main of the sub-search matched a subset of a stored data string that has subsequent subsets in the tree structure, determining if the postfix of the sub-search matches the initial part of any of those subsequent subsets; b) if the last data entry in the main of the sub-search matched a subset of a stored data string that has no subsequent subsets in the tree structure, determining if the postfix of the sub-search matches the initial part of the postfix of that stored data string; or c) if the last data entry in the main of the sub-search matched part of a subset of a stored data string, determining if the postfix of the sub-search matches the initial part of the remaining part of that subset.

An exemplary method of matching biometric data against a database of stored biometric data, wherein the stored biometric data is stored as a plurality of data strings each in a structured form, the structured form including the storage of subsets of each data string of predetermined length stored in as the edges of a tree structure along with prefix data including all possible prefixes for each such edge which have length less than said predetermined length, includes the steps of: dividing the biometric data to be matched into a plurality of sub-searches, the number of sub-searches being equal to the predetermined length of the subsets and each sub-search containing a prefix, a main and a postfix, by the steps of: setting the prefix of the first sub-search to be null, setting the prefix of the second sub-search to be the first item in the search string, and setting the prefix of the ith sub-search to be the first (i−1) items in the search string for all remaining sub-searches; setting the main of each sub-search to be those items in the search string immediately following the prefix which make up complete subsets of the search string, the subsets being of said predetermined length; setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered: determining if the main of the sub-search is contained in the subsets of any of the stored data strings, if it is not then moving to the next sub-search; if it is, determining if the prefix of the sub-search is contained in the prefix data stored for that subset, if it is not then moving to the next sub-search; if it is, determining if the postfix of the sub-search is contained in the stored data strings by: a) if the last data entry in the main of the sub-search matched a subset of a stored data string that has subsequent subsets in the tree structure, determining if the postfix of the sub-search matches the initial part of any of those subsequent subsets; b) if the last data entry in the main of the sub-search matched a subset of a stored data string that has no subsequent subsets in the tree structure, determining if the postfix of the sub-search matches the initial part of the postfix of that stored data string; or c) if the last data entry in the main of the sub-search matched part of a subset of a stored data string, determining if the postfix of the sub-search matches the initial part of the remaining part of that subset.

An exemplary computer readable medium or media having a computer program for running on a computer system to store data, includes a program carrying out the steps of: dividing the data into as many complete subsets of predetermined length as possible with any remainder being designated as a postfix; arranging the subsets of data into a tree structure with nodes joined by edges representing one or more of the subsets; determining, for each edge in said tree, a prefix table which is a list of all possible prefixes for that subset within the data of lengths less than said predetermined length; and storing the subsets, the tree structure, the prefix tables and the postfix.

An exemplary computer readable medium or media having a computer program for running on a computer system to search data stored in the computer system which constitutes a plurality of data strings each in a structured form, the structured form including the storage of subsets of each data string of predetermined length stored in as the edges of a tree structure along with prefix data including all possible prefixes for each such edge which have length less than said predetermined length, includes a program carrying out the steps of: dividing the search string into a plurality of sub-searches, the number of sub-searches being equal to the predetermined length of the subsets and each sub-search containing a prefix, a main and a postfix, by the steps of: setting the prefix of the first sub-search to be null, setting the prefix of the second sub-search to be the first item in the search string, and setting the prefix of the ith sub-search to be the first (i−1) items in the search string for all remaining sub-searches; setting the main of each sub-search to be those items in the search string immediately following the prefix which make up complete subsets of the search string, the subsets being of said predetermined length; setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered: determining if the main of the sub-search is contained in the subsets of any of the stored data strings, if it is not then moving to the next sub-search; if it is, determining if the prefix of the sub-search is contained in the prefix data stored for that subset, if it is not then moving to the next sub-search; if it is, determining if the postfix of the sub-search is contained in the stored data strings by: a) if the last data entry in the main of the sub-search matched a subset of a stored data string that has subsequent subsets in the tree structure, determining if the postfix of the sub-search matches the initial part of any of those subsequent subsets; b) if the last data entry in the main of the sub-search matched a subset of a stored data string that has no subsequent subsets in the tree structure, determining if the postfix of the sub-search matches the initial part of the postfix of that stored data string; or c) if the last data entry in the main of the sub-search matched part of a subset of a stored data string, determining if the postfix of the sub-search matches the initial part of the remaining part of that subset.

BRIEF DESCRIPTION OF THE DRAWINGS

Embodiments of the invention will now be described by way of example with reference to the accompanying drawings in which.

DETAILED DESCRIPTION

At its broadest, a first aspect of the present invention provides a method of storing a data string in a structured form by dividing it into subsets and storing prefix information associated with each subset.

A first aspect of the present invention provides a method of storing a data string in a structured form, the method including the steps of: dividing the data into as many complete subsets of predetermined length as possible with any remainder being designated as a postfix; arranging the subsets of data into a tree structure with nodes joined by edges representing one or more of the subsets; determining, for each edge in said tree, a prefix table which is a list of all possible prefixes for that subset within the data of lengths less than said predetermined length; and storing the subsets, the tree structure, the prefix tables and the postfix.

Preferably the data is in binary form. In such circumstances, the predetermined length may be, for example, a byte, word, double-word or similar construct.

Whilst grouping bits into bytes (or other similar collective arrangements) for processing is a simple compression technique, it is not straightforward to implement in a structured tree arrangement such as a suffix tree. This is because a match between two binary strings can happen at unaligned byte positions, which can render a basic suffix tree on a byte (or other higher) level insufficient to support pattern matching. Thus along with the compression, extra information needs to be stored alongside the basic structure. In the present aspect, this extra information is provided by the prefix tables associated with each subset.

The method of the present aspect is preferably implemented so as to enable storage of the data in linear time.

Preferably the tree structure is a suffix tree. A suffix tree of a string is a tree structure that presents all suffixes of that string. This tree structure is an important data structure for stringology and is known to solve many string problems. The preferred tree structure of the present aspect is a variant suffix tree which is adapted to support pattern matching, particularly binary pattern matching.

By providing additional information (in the prefix tables and the postfix), the tree structure of the data stored by the present aspect can address the issue of space complexity when using the suffix tree to present binary strings by grouping bits into bytes for presenting and processing.

In the example of binary data stored in subsets of byte length, each prefix table incurs a memory cost of no more than 32 bytes, and it takes only two bytes for the postfix of the tree. This extra memory is well below the saving memory the tree can provide by grouping bits into bytes for presentation. As a result data stored according to the method of the present aspect could help to reduce memory consumption. It will be appreciated that corresponding memory requirements (and savings) will arise in other configurations of the data and subsets.

Furthermore, by reducing the tree size, the method of the present aspect can also significantly reduces the tree construction time.

The method of the present aspect may include any combination of some, all or none of the above described preferred and optional features.

At its broadest a second aspect of the present invention provides a method for determining whether a search string is contained in data which has been stored in a structured form containing subsets of the data and prefix information for those subsets by dividing the search string into a plurality of sub-searches and comparing each of these sub-searches to the stored data.

A second aspect of the present invention provides a method of determining whether a search string is contained in stored data which stores a plurality of data strings each in a structured form, the structured form including the storage of subsets of each data string of predetermined length stored in as the edges of a tree structure along with prefix data including all possible prefixes for each such edge which have length less than said predetermined length, the method including the steps of: dividing the search string into a plurality of sub-searches, the number of sub-searches being equal to the predetermined length of the subsets and each sub-search containing a prefix, a main and a postfix, by the steps of: setting the prefix of the first sub-search to be null, setting the prefix of the second sub-search to be the first item in the search string, and setting the prefix of the ith sub-search to be the first (i−1) items in the search string for all remaining sub-searches; setting the main of each sub-search to be those items in the search string immediately following the prefix which make up complete subsets of the search string, the subsets being of said predetermined length; setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered: determining if the main of the sub-search is contained in the subsets of any of the stored data strings, if it is not then moving to the next sub-search; if it is, determining if the prefix of the sub-search is contained in the prefix data stored for that subset, if it is not then moving to the next sub-search; if it is, determining if the postfix of the sub-search is contained in the stored data strings by: a) if the last data entry in the main of the sub-search matched a subset of a stored data string that has subsequent subsets in the tree structure, determining if the postfix of the sub-search matches the initial part of any of those subsequent subsets; b) if the last data entry in the main of the sub-search matched a subset of a stored data string that has no subsequent subsets in the tree structure, determining if the postfix of the sub-search matches the initial part of the postfix of that stored data string; or c) if the last data entry in the main of the sub-search matched part of a subset of a stored data string, determining if the postfix of the sub-search matches the initial part of the remaining part of that subset.

Preferably the stored data has been stored by a method according to the above first aspect, but this is not essential.

Preferably the stored data and the search string are in binary form. In such circumstances, the predetermined length may be, for example, a byte, word, double-word or similar construct.

Even though the method of the present aspect operates by generating more cases for search (the sub-searches), its search time can still be comparative to that of searching a basic tree structure (i.e. without the prefix information) due to the efficiency in searching the data on the basis of the stored subsets.

A further aspect of the present invention provides a method of finding a specified sequence in one or more stored DNA sequences, being a method according to the above second aspect (including some all, or none of the optional and preferred features of that aspect), wherein the stored DNA sequences are the data strings stored in a structured form and the search string is the specified sequence.

A further aspect of the present invention provides a method of testing a pattern definition for a virus or other malware against known genuine data, being a method according to the above second aspect (including some all, or none of the optional and preferred features of that aspect), wherein the genuine data is stored as the plurality of data strings in a structured form and the search string is the pattern definition.

A further aspect of the present invention provides a method of matching biometric data against a database of stored biometric data, being a method according to the above second aspect (including some all, or none of the optional and preferred features of that aspect), wherein the stored biometric data is stored as the plurality of data strings in a structured form and the search string Is the biometric data to be matched.

Further aspects of the present invention provide computer programs which, when run on a computer, carry out the methods of the above aspects, including some, all or none of the optional and preferred features of those aspects.

Further aspects of the present invention provide computer readable medium or media having computer programs according to the aspects described in the previous paragraph.

Further aspects of the present invention provide systems which implement the method of the above aspects, for example computer systems which run computer programs arranged to carry out these methods. Such computer systems may include processors which are arranged to carry out these methods and storage devices in which the data in structured form is stored. The storage devices include RAM, ROM, flash memory, hard disk drives and other well-known storage devices.

A first embodiment of the present invention provides a method of creating a novel variant suffix tree of a string. This suffix tree will be referred to herein as a "CS-Tree".

The basic structure of a CS-Tree is exactly the same as the suffix tree structure that supports standard text pattern matching. However, in embodiments of the present invention, given a binary string, each binary value is not considered as a single value. Instead, every 8 bits of the binary string are grouped to a byte (i.e., the text character) and the last bits that cannot form a byte are ignored to obtain a normal text strings. Suffix tree is then built for that text string.

Figure 1:
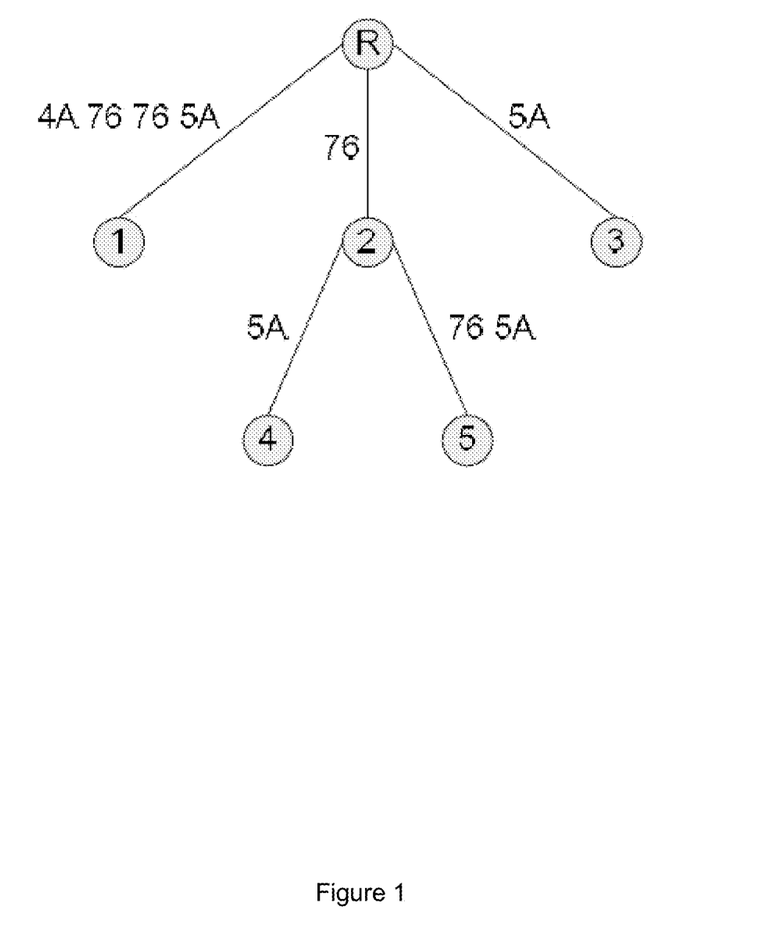
FIG. 1 shows the basic suffix tree for a text string and is used to illustrate a method according to an embodiment of the invention.

For example, given a binary string 01001010 01110110 01110110 01011010 001, without considering the last three bits 001, we could convert this string to a text string as 4A 76 76 5A and build the suffix tree for the converted string as shown in FIG. 1. Since this basic tree structure cannot support binary pattern matching directly, it must be modified it by adding two important features: a) binary prefix tables at edges of the tree and b) a binary postfix of the tree. These two extra information features are used to determine the pattern matches even if they are not aligned in bytes. Details of these two features are described below.

A binary prefix table (BPT) of an edge is a table that contains binary strings with lengths from 1 to 7 bits that could appear before the text leading to that edge. For example, let us consider the edge 5A connecting the root R and node 3. Since 5A is preceded by the binary string 01110110, the binary strings in its BPT, whose lengths are from 1 to 7 bits, are respectively 0, 10, 110, 0110, 10110, 110110, and 1110110. Similarly, if we consider the edge 76 5A connecting node 2 and node 5, since the full text leading to that edge, 76 76 5A, is preceded by the binary string 01001010, its BPT contains binary strings 0, 10, 010, 1010, 01010, 001010, and 1001010. Differently, the BPT of the edge 76 connecting the root R and node 2 is a merger of BPTs from its children edges. The reason is because if we consider the edge itself without considering descendant edges, there are two cases leading to the edge 76. These are cases starting at the second and the third bytes in the input binary string, which are actually the two children edges of the edge 76. Thus, the BPT of the edge contains binary strings specifying for these two cases is a merge from BPTs of its children edges. Detail of BPTs of edges of the suffix tree is shown in FIG. 2.

The postfix of the tree is a binary string that could appear after leaves and there is exactly one binary postfix for a tree. It is actually the remaining last bits of the binary string that we ignored before after grouping bits into bytes to build the CS-Tree. In our example, it is 001.

Figure 2:
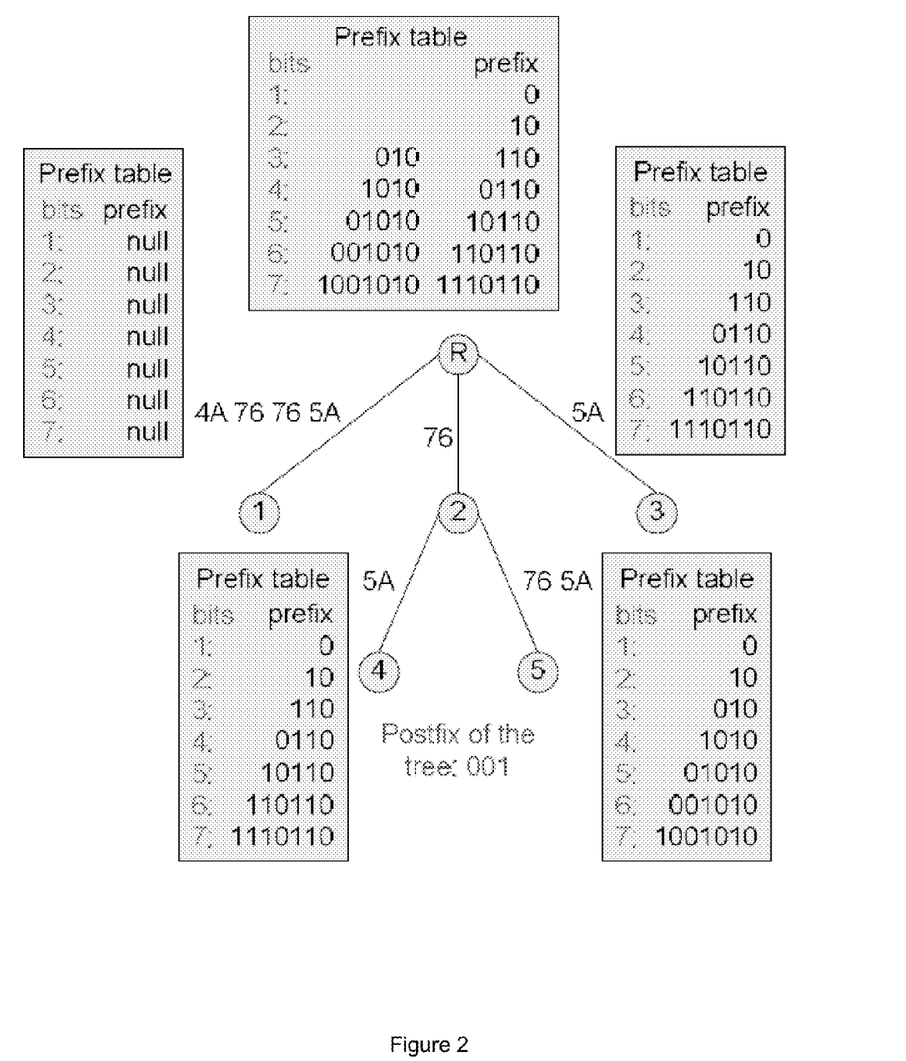
FIG. 2 shows the suffix tree of FIG. 1 which has been modified as part of a method according to an embodiment of the invention.

The complete CS-Tree after adding BPTs and binary postfix to the basic suffix tree is shown in FIG. 2. Note that for the binary postfix of the tree whose length is less than 8, we can always convert it to a single value. As a result, we only need one byte to keep this converted value and another byte to record the length of the postfix. On the other hand, for each BPT there are $2^1$ possible cases of binary strings length 1, $2^2$ possible cases of binary strings length 2, $2^3$ possible cases of binary strings length 3, and so on. Thus, the total number of different binary strings that may exist in a BPT is $2^1+2^2+\ldots+2^7=254$. In this case, if we use one bit to represent the existence of a binary string, we need 254 bits for a BPT, and hence it takes at most 254/8=32 bytes of memory for a BPT.

Tree Construction

A number of algorithms have been proposed to construct standard suffix trees in linear time and most of them can be modified to build CS-Tree with the same time complexity. The preferred embodiment of the present invention is a modification of McCreight algorithm [5] to build CS-Tree in which the modified algorithm incurs O(1) to calculate the postfix of the tree and also O(1) for each action of creating or updating BPTs, which are done on the fly with the tree construction. Detail of the algorithm is set out below.

---

Algorithm 1: Suffix_Tree_Construction_By_McCreight (string s[1..n])

--- create an empty CS-Tree with the root R
create a self-pointed suffix link at R
create node 1 and edge s[1..n] connecting node R and 1
Create_BPT(s[1..n], empty)
for i = 1 to n do
  if head(i) is NIL then
    set head(i+1) = slow_scan(R, s[i+1..n])
    if head(i+1) is NIL then
      create node (i+1) and edge s[i+1..n] connecting R and (i+1)
      Create_BPT(s[i+1..n], s[i])
    else
      create node head(i+1) as a node at the middle of the edge s[i+1..n]
      create node i+1 and an empty edge connecting head(i+1) and (i + 1)
      Update_BPTs(head(i+1), s[i])
    end if
  else
    set u = the parent of head(i)
    set v = edge connecting u and head(i)
    if u is not R then
      set w = fast_scan(suffix_link(u), v)
    else
      set w = fast_scan(R, v[2..|v|])
    end if
    if w is an edge then
      set head(i+1) = w
      create node head(i+1)
      Update_BPTs(head(i+1), s[i])
    else if w is a node then
      head(i+1) = slow_scan(w, tail(i))
      if (head(i+1) is NIL then
        create node (i+1) and edge s[i+1..n] connecting w and i+1
        Create_BPT(s[i+1..n], s[i])
      else
        create node head(i+1) as a node at the middle of the edge s[i+1..n]
        create node (i+1) and an empty edge connecting head(i+1) and (i + 1)
        Update_BPTs(head(i+1), s[i])
      end if
    end if
    create suffix_link for head(i) pointing to w
  end if
end for

---

In this algorithm, the methods: tail, slow_scan, and fast_scan, are the same as the ones used in McCreight algorithm while Create_BPT and Update_BPTs are new ones. They are explained as follows.

tail(i) returns the string such that x[i . . . n]=head(i)tail(i)

slow_scan(location l, string s) returns the longest common prefix (or longest common path) of s with existing suffixes in the tree starting at location l. If no common path is found, it returns NIL.

fast_scan(location l, string s) also returns the longest common path of s with existing suffixes in the tree starting at location l. The difference between slow_scan and fast_scan, however, is that in slow_scan we do not know whether s has a common prefix or not while in fast_scan, we know that it has. Thus, for fast_scan, we only need to follow the edge start with the first character of s to search the longest common prefix.

Create_BPT(edge e, prefix_byte b): creates a BPT for the edge e and sets its values based on the value of the prefix byte b.

Update_BPTs(node n, prefix_byte b): updates BPTs of edges all the way from the node n to the root based on the value of the prefix byte b. Note that to achieve O(1) cost for BPT update, descendent edges once generated need to also store pointers to BPTs of their ancestor edges.

Binary Pattern Matching Algorithm

A second embodiment of the present invention provides a method of binary pattern matching using the CS-Tree.

In the method of this embodiment, given a search pattern, 8 different search cases are generated, each of which contains a triplet: a prefix, a main, and a postfix. The prefix part of each case is extracted from the head of the search pattern and contains a binary string length from 0 to 7. The remaining part of the search pattern after excluding the prefix part is grouped into bytes similar to the way that the CS-Tree structure described in relation to the first method above. These bytes are converted to a text string and form the main part of each case. Finally, the rest of the search pattern after excluding the prefix and main parts is the postfix. Table 1 shows an example of a binary search pattern for 10100111 01100111 01.

TABLE 1 binary search cases of 10100111 01100111 01

| Case | Prefix | Main | Postfix |
|---|---|---|---|
| 0 |  | 10100111 (A7) 01100111 (67) | 01 |
| 1 | 1 | 01001110 (4E) 11001110 (CE) | 1 |
| 2 | 10 | 10011101 (9D) 10011101 (9D) |  |
| 3 | 101 | 00111011 (3B) | 0011101 |
| 4 | 1010 | 01110110 (76) | 011101 |
| 5 | 10100 | 11101100 (EC) | 11101 |
| 6 | 101001 | 11011001 (D9) | 1101 |
| 7 | 1010011 | 10110011 (B3) | 101 |

For each of the search cases generated in the first step the CS-Tree is used to perform pattern matching for the "main" part. If any match exists, the prefix and postfix are then checked. If there is any case where all three search parts are found, the pattern is matched with the indexed data.

To check prefix part, the BPT of the edge where the match ends is used.

To check the postfix, three cases have to be considered as follows:

Case 1: the match ends at an internal node. In this situation a further check is performed to see if the postfix matches a prefix of any edge going out of the node to its children. For example, the search pattern 10100111 01100111 01 in Table 1 could be found in the CS-Tree in FIG. 2 because when we consider the search case 4, the main part matches the edge 76, which ends at the internal node 2, while the BPT of the edge 76 contains the prefix part 1010 and the postfix 011101 matches an initial portion of the edge 76 5A. This comparison with the next edge can be made by bit-by-bit searching, or by shifting the first byte of that edge 2 bits to the right before making a comparison.

Case 2: the match ends at a leaf node. In this situation a further check is performed to see if the postfix is a prefix of the CS-Tree's postfix. For example, given the search pattern 11001011 01000, the search case 3 of this pattern, which contains the triplet (110, 01011010, 00), matches the CS-Tree in FIG. 2. This is because the main part matches the edge 5A, which ends at the leaf node 3, while the BPT of the edge 5A contains the prefix part 110 and the postfix 00 is a prefix of the CS-Tree's postfix 001.

Case 3: the match ends in the middle of an edge. In this situation a further check is performed to see if the postfix is a prefix of the remaining part of the edge. For example, given the search pattern 00111011 00111011 0010, the search case 1 of this pattern, which contains the triplet (0, 01110110 01110110, 010), matches the CS-Tree in FIG. 2. This is because the main part is covered by the edges 76 76 5A, whose match stops in the middle of the edge 76 5A, while the BPT of the edge 76 5A contains the prefix part 0 and the postfix 010 is found in the initial portion of the remaining part of the edge 01011010 (5A).

The overall pattern matching algorithm for this embodiment is set out in Algorithm 2 below. Note that while the number of search cases for a single pattern is increased from 1 to 8, the search time is not greatly increased. This is because binary data has already been "packed" to byte data for searching the main part (providing an 8-fold saving in the searching of this part).

Therefore, even though the search speed of the CS-Tree under the method of the present embodiment and those of traditional suffix trees is comparative, use of the CS-Tree structure (and its associated methods) is advantageous compared to traditional suffix trees in terms of memory usage since it requires much less memory. This saving is very important given the enormous amount of binary data which is currently being stored and given that suffix trees will lose their efficiency if they cannot be stored completely in the memory.

---

Algorithm 2: Binary_Pattern_Matching (CS-Tree t, Pattern p)

---

```
for i = 0 to 7 do
    prefix = p[0..i - 1] //the bit string from position 0 to i - 1
    main = a text string formed by grouping every 8 bits of p to a
byte after removing prefix
    postfix = the remaining bits of p that cannot form a byte
    if main is found in T at a position pos then //linear search from the
    root of T
        set edge = the edge leading to pos
        if prefix = NULL or prefix is found in the BPT of edge
then
            if pos is an internal node then
                Case 1 is checked
                return result
            else if pos is a leaf node
                Case 2 is checked
                return result
            else {pos is an edge}
                Case 3 is checked
                return result
            end if
        else
            return not found
        end if
    else
        return not found
    end if
end for
```

---

It is important to note that while the methods described above operate by grouping bits into bytes to form the "CS-Tree", these methods can be extended to group bits into words, double-words, etc. in order to further reduce the size of the tree. In these cases, the structures of the postfix and the BPTs will need to be modified correspondingly. This may result in greater data storage savings if the typical data structures and search patterns are larger.

The CS-Tree structure and the methods of created and searching this structure can be employed in many applications across different domains that perform binary pattern matching in which the binary string is known in advance. A non-exhaustive list of examples is given below.

Biological applications: a general request could be to find a specific gene in a DNA sequence, in which the DNA belongs to a DNA database and is known in advance. Since both the gene and DNA are often represented in binary format, binary pattern matching can be used.

Anti-virus applications: before releasing a new pattern (or definition) for virus, spyware, or malware, it is important to test the existence of the new pattern against previously collected legal traffic or documents to make sure that it does not generate false positive results. Since the pattern is usually created in binary form, binary pattern matching can be used.

Face/fingerprinting recognition applications: once a face or fingerprint needs to be checked, features are extracted and comparisons are done with known features in the database. Since the face/fingerprint features are often stored in binary form, binary pattern matching can be used.

Data mining/information retrieval applications with large datasets: to support fast data mining or information retrieval for large datasets, summarization techniques such as boom-filter are often used to generate summaries for both input requests and documents in the dataset. Since these summaries are generally created and stored in binary form, binary pattern matching can be used.

The methods described above may be implemented in a computer system (in particular in computer hardware or in computer software).

The term "computer system" includes the hardware, software and data storage devices for embodying a system or carrying out a method according to the above described embodiments. For example, the computer system may comprise a central processing unit (CPU), input means, output means and data storage. As discussed in the example above, the CPU may be a multiple core CPU.

Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods described above may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

REFERENCES

1. A. Andersson and S. Nilsson. Efficient implementation of suffix trees. Software Practice and Experience, 25(2):129-141, 1995.
2. L. M. S. Russo, G. Navarro, and A. L. Oliveira. Fully compressed suffix trees. ACM Transactions on Algorithms, 7(4):1-34, 2011.
3. T. Bell, M. Powell, A. Mukherjee, and D. Adjeroh. Searching BWT compressed text with the Boyer-Moore algorithm and binary search. In Proceedings of the IEEE Data Compression Conference, 2002.
4. S. T. Klein and M. K. Ben-Nissan. Accelerating Boyer-Moore Searches on Binary Texts. In Proceedings of the 12th International Conference on Implementation and Application of Automata, 2007.
5. E. M. McCreight. A space-economical suffix tree construction algorithm. In Journal of the ACM, Volume 23, Pages 262-272, 1976

All references referred to above are hereby incorporated by reference.

The invention claimed is:

1. A method of determining whether a search string is contained in stored data which stores a plurality of data strings each in a structured form, the structured form including the storage of subsets of each data string of predetermined length stored in as the edges of a tree structure along with prefix data including all possible prefixes for each such edge which have length less than said predetermined length, the method including the steps of:

dividing the search string into a plurality of sub-searches, the number of sub-searches being equal to the predetermined length of the subsets and each sub-search containing a prefix, a main and a postfix, by the steps of:

setting the prefix of the first sub-search to be null, setting the prefix of the second sub-search to be the first item in the search string, and setting the prefix of the ith sub-search to be the first (i−1) items in the search string for all remaining sub-searches;

setting the main of each sub-search to be those items in the search string immediately following the prefix which make up complete subsets of the search string, the subsets being of said predetermined length;

setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered:

determining if the main of the sub-search is contained in the subsets of any of the stored data strings, if it is not then moving to the next sub-search;

if it is, determining if the prefix of the sub-search is contained in the prefix data stored for that subset, if it is not then moving to the next sub-search;

if it is, determining if the postfix of the sub-search is contained in the stored data strings by:

a) if the last data entry in the main of the sub-search matched a subset of a stored data string that has subsequent subsets in the tree structure, determining if the postfix of the sub-search matches the initial part of any of those subsequent subsets;

b) if the last data entry in the main of the sub-search matched a subset of a stored data string that has no subsequent subsets in the tree structure, determining if the postfix of the sub-search matches the initial part of the postfix of that stored data string; or c) if the last data entry in the main of the sub-search matched part of a subset of a stored data string, determining if the postfix of the sub-search matches the initial part of the remaining part of that subset.

2. A method of finding a specified sequence in one or more stored DNA sequences, wherein the stored DNA sequences are each stored in a structured form, the structured form including the storage of subsets of each DNA sequence of predetermined length stored in as the edges of a tree structure along with prefix data including all possible prefixes for each such edge which have length less than said predetermined length, the method including the steps of:

dividing the specified sequence into a plurality of sub-searches, the number of sub-searches being equal to the predetermined length of the subsets and each sub-search containing a prefix, a main and a postfix, by the steps of:

setting the prefix of the first sub-search to be null, setting the prefix of the second sub-search to be the first item in the search string, and setting the prefix of the ith sub-search to be the first (i−1) items in the search string for all remaining sub-searches;

setting the main of each sub-search to be those items in the search string immediately following the prefix which make up complete subsets of the search string, the subsets being of said predetermined length;

setting the postfix of each sub-search to be those items at the end of the search string which are not included in the prefix or main or, if there are no such items, to be null, comparing each of the sub-searches to the stored data to determine if a match exists by, for each sub-search, until all sub-searches have been considered:

determining if the main of the sub-search is contained in the subsets of any of the stored data strings, if it is not then moving to the next sub-search;

if it is, determining if the prefix of the sub-search is contained in the prefix data stored for that subset, if it is not then moving to the next sub-search;

if it is, determining if the postfix of the sub-search is contained in the stored data strings by:

a) if the last data entry in the main of the sub-search matched a subset of a stored sequence that has subsequent subsets in the tree structure, determining if the postfix of the sub-search matches the initial part of any of those subsequent subsets;

b) if the last data entry in the main of the sub-search matched a subset of a stored sequence that has no subsequent subsets in the tree structure, determining if the postfix of the sub-search matches the initial part of the postfix of that stored data string; or c) if the last data entry in the main of the sub-search matched part of a subset of a stored sequence, determining if the postfix of the sub-search matches the initial part of the remaining part of that subset.

3. A method of testing a pattern definition for a virus or other malware against known genuine data, wherein the genuine data is stored as a plurality of data strings each in a structured form, the structured form including the storage of subsets of each data string of predetermined length stored in as the edges of a tree structure along with prefix data including all possible prefixes for each such edge which have length less than said predetermined length, the method including the steps of:

dividing the pattern definition into a plurality of sub-searches, the number of sub-searches being equal to the predetermined length of the subsets and each sub-search containing a prefix, a main and a postfix, by the steps of:
setting the prefix of the first sub-search to be null, setting the prefix of the second sub-search to be the first item in the search string, and setting the prefix of the ith sub-search to be the first (i–1) items in the search string for all remaining sub-searches;
setting the main of each sub-search to be those items in the search string immediately following the prefix which make up complete subsets of the search string, the subsets being of said predetermined length;
setting the postfix of each sub-search to be those items at the end of the search string which are not included in the prefix or main or, if there are no such items, to be null,
comparing each of the sub-searches to the stored data to determine if a match exists by, for each sub-search, until all sub-searches have been considered:
determining if the main of the sub-search is contained in the subsets of any of the stored data strings, if it is not then moving to the next sub-search;
if it is, determining if the prefix of the sub-search is contained in the prefix data stored for that subset, if it is not then moving to the next sub-search;
if it is, determining if the postfix of the sub-search is contained in the stored data strings by:
  a) if the last data entry in the main of the sub-search matched a subset of a stored data string that has subsequent subsets in the tree structure, determining if the postfix of the sub-search matches the initial part of any of those subsequent subsets;
  b) if the last data entry in the main of the sub-search matched a subset of a stored data string that has no subsequent subsets in the tree structure, determining if the postfix of the sub-search matches the initial part of the postfix of that stored data string; or
  c) if the last data entry in the main of the sub-search matched part of a subset of a stored data string, determining if the postfix of the sub-search matches the initial part of the remaining part of that subset.

4. A method of matching biometric data against a database of stored biometric data, wherein the stored biometric data is stored as a plurality of data strings each in a structured form, the structured form including the storage of subsets of each data string of predetermined length stored in as the edges of a tree structure along with prefix data including all possible prefixes for each such edge which have length less than said predetermined length, the method including the steps of:
dividing the biometric data to be matched into a plurality of sub-searches, the number of sub-searches being equal to the predetermined length of the subsets and each sub-search containing a prefix, a main and a postfix, by the steps of:
setting the prefix of the first sub-search to be null, setting the prefix of the second sub-search to be the first item in the search string, and setting the prefix of the ith sub-search to be the first (i–1) items in the search string for all remaining sub-searches;
setting the main of each sub-search to be those items in the search string immediately following the prefix which make up complete subsets of the search string, the subsets being of said predetermined length;
setting the postfix of each sub-search to be those items at the end of the search string which are not included in the prefix or main or, if there are no such items, to be null,
comparing each of the sub-searches to the stored data to determine if a match exists by, for each sub-search, until all sub-searches have been considered:
determining if the main of the sub-search is contained in the subsets of any of the stored data strings, if it is not then moving to the next sub-search;
if it is, determining if the prefix of the sub-search is contained in the prefix data stored for that subset, if it is not then moving to the next sub-search;
if it is, determining if the postfix of the sub-search is contained in the stored data strings by:
  a) if the last data entry in the main of the sub-search matched a subset of a stored data string that has subsequent subsets in the tree structure, determining if the postfix of the sub-search matches the initial part of any of those subsequent subsets;
  b) if the last data entry in the main of the sub-search matched a subset of a stored data string that has no subsequent subsets in the tree structure, determining if the postfix of the sub-search matches the initial part of the postfix of that stored data string; or
  c) if the last data entry in the main of the sub-search matched part of a subset of a stored data string, determining if the postfix of the sub-search matches the initial part of the remaining part of that subset.

5. A non-transitory computer readable medium or media have a computer program for running on a computer system to search data stored in the computer system which constitutes a plurality of data strings each in a structured form, the structured form including the storage of subsets of each data string of predetermined length stored in as the edges of a tree structure along with prefix data including all possible prefixes for each such edge which have length less than said predetermined length, the program carrying out the steps of:
dividing the search string into a plurality of sub-searches, the number of sub-searches being equal to the predetermined length of the subsets and each sub-search containing a prefix, a main and a postfix, by the steps of:
setting the prefix of the first sub-search to be null, setting the prefix of the second sub-search to be the first item in the search string, and setting the prefix of the ith sub-search to be the first (i–1) items in the search string for all remaining sub-searches;
setting the main of each sub-search to be those items in the search string immediately following the prefix which make up complete subsets of the search string, the subsets being of said predetermined length;
setting the postfix of each sub-search to be those items at the end of the search string which are not included in the prefix or main or, if there are no such items, to be null,
comparing each of the sub-searches to the stored data to determine if a match exists by, for each sub-search, until all sub-searches have been considered:
determining if the main of the sub-search is contained in the subsets of any of the stored data strings, if it is not then moving to the next sub-search;
if it is, determining if the prefix of the sub-search is contained in the prefix data stored for that subset, if it is not then moving to the next sub-search;
if it is, determining if the postfix of the sub-search is contained in the stored data strings by:

a) if the last data entry in the main of the sub-search matched a subset of a stored data string that has subsequent subsets in the tree structure, determining if the postfix of the sub-search matches the initial part of any of those subsequent subsets;
b) if the last data entry in the main of the sub-search matched a subset of a stored data string that has no subsequent subsets in the tree structure, determining if the postfix of the sub-search matches the initial part of the postfix of that stored data string; or
c) if the last data entry in the main of the sub-search matched part of a subset of a stored data string, determining if the postfix of the sub-search matches the initial part of the remaining part of that subset.

* * * * *